US009220978B2

(12) United States Patent
Kobayashi et al.

(10) Patent No.: US 9,220,978 B2
(45) Date of Patent: Dec. 29, 2015

(54) GAME APPARATUS, GAME INTERRUPTION PROGRAM, STORAGE MEDIUM STORED WITH GAME INTERRUPTION PROGRAM

(75) Inventors: Motoki Kobayashi, Tokyo (JP); Takeshi Kono, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 491 days.

(21) Appl. No.: 13/392,141

(22) PCT Filed: Jul. 21, 2010

(86) PCT No.: PCT/JP2010/062271
§ 371 (c)(1),
(2), (4) Date: Apr. 6, 2012

(87) PCT Pub. No.: WO2011/033854
PCT Pub. Date: Mar. 24, 2011

(65) Prior Publication Data
US 2012/0190459 A1      Jul. 26, 2012

(30) Foreign Application Priority Data

Sep. 18, 2009  (JP) ................................. 2009-218140

(51) Int. Cl.
| A63F 13/49 | (2014.01) |
| A63F 13/493 | (2014.01) |
| A63F 13/40 | (2014.01) |

(52) U.S. Cl.
CPC ........... *A63F 13/10* (2013.01); *A63F 2300/206* (2013.01); *A63F 2300/636* (2013.01)

(58) Field of Classification Search
CPC .............. A63F 13/10; A63F 2300/554; A63F 2300/5526
USPC ................................................ 463/24, 29, 43
See application file for complete search history.

(56) References Cited

U.S. PATENT DOCUMENTS 5,547,202 A * 8/1996 Tsumura .......................... 463/29
6,561,901 B1 * 5/2003 Takase ............................ 463/24
(Continued)

FOREIGN PATENT DOCUMENTS

| EP | 0431723 A2 | 6/1991 |
| EP | 983782 A | 3/2000 |
| JP | 2002207537 A | 7/2002 |
| JP | 2006164203 A | 6/2006 |
| JP | 2008027354 A | 2/2008 |

OTHER PUBLICATIONS

Office Action for corresponding JP Application No. 2009218140, dated Jan. 11, 2013.
(Continued)

*Primary Examiner* — Allen Chan
(74) *Attorney, Agent, or Firm* — Matthew B. Dernier, Esq

(57) ABSTRACT

A game execution unit 101 of a game apparatus 2 executes game processing in conformity with predetermined setting information including a game program, and terminates the game processing in progress in response to a command for temporary interruption from a user. A storage control unit 102 restores the state at the time of game termination by the game execution unit 101, and stores in a storage unit 107 interruption information allowing resumption of the game processing in conformity with the command for temporary interruption from the user. A setting changing unit 103 changes the predetermined setting information in response to a change command from the user. The storage control unit 102 deletes the interruption information stored in the storage unit 107 in accordance with setting change carried out by the setting changing unit 103.

12 Claims, 11 Drawing Sheets

(56) References Cited

U.S. PATENT DOCUMENTS

| | | |
|---|---|---|
| 7,660,976 B2 | 2/2010 | Kurosaki |
| 2003/0088831 A1* | 5/2003 | Bauer et al. ................... 715/516 |
| 2003/0100347 A1 | 5/2003 | Okada et al. |
| 2004/0087373 A1* | 5/2004 | Choi ............................... 463/42 |
| 2005/0026700 A1* | 2/2005 | Blanco ........................... 463/43 |
| 2006/0119878 A1 | 6/2006 | Kurosaki |
| 2006/0148571 A1* | 7/2006 | Hossack et al. ................ 463/43 |
| 2007/0010328 A1* | 1/2007 | Yokota et al. ................... 463/42 |
| 2008/0070703 A1* | 3/2008 | Campo et al. ................... 463/46 |

OTHER PUBLICATIONS

International Search Report for corresponding PCT Application PCT/JP2010/062271, dated Aug. 31, 2010.

Search Report for corresponding EP Application No. 10816967 dated Jul. 8, 2014.

* cited by examiner

GAME APPARATUS, GAME INTERRUPTION PROGRAM, STORAGE MEDIUM STORED WITH GAME INTERRUPTION PROGRAM

TECHNICAL FIELD

The present invention relates to a game apparatus, a game interruption program, and a storage medium stored with the game interruption program.

BACKGROUND ART

Game apparatus for executing game processing in conformity with a predetermined game program are well known.

PRIOR ART DOCUMENTS

Patent Documents

[Patent Document 1] EP 983782A Specification

SUMMARY OF THE INVENTION

With a conventional game apparatus, a user wanting to interrupt a game in progress saves save data and then terminates the game in conformity with a game program. As a result, operation inputs when interrupting differ depending on the game being executed, which is cumbersome. Moreover, depending on the game program, there are cases where a save point for creating save data is preset, thereby not allowing interruption of the game at an arbitrary time.

SUMMARY OF THE INVENTION

The present invention, therefore, aims to provide a game apparatus capable of easily interrupting and resuming a game in progress at arbitrary times.

A game apparatus according to a first aspect of the present invention includes a game execution means, a storage control means, and a setting changing means.

The game execution means executes game processing in conformity with predetermined setting information including a game program, and terminates the game processing in progress in response to a temporary interruption command from a user. The storage control means restores a state at the time of game termination by the game execution means and stores in a storage means interruption information allowing resumption of the game processing in conformity with the temporary interruption command from the user. The setting changing means changes the predetermined setting information in response to a change command from the user. The storage control means deletes the interruption information stored in the storage means in accordance with setting change carried out by the setting changing means.

A game apparatus according to a second aspect of the present invention includes a display control means, a game execution means, and a storage control means.

The display control means displays on a display means a screen for requesting a user to select either a temporary interruption command for terminating a game that may be resumed from a state at the time of game termination, or a normal termination command for terminating a game that cannot be resumed from a state at the time of game termination. The game execution means executes game processing in conformity with predetermined setting information including a game program, and terminates the game processing in progress in response to either the temporary interruption command or the normal termination command from the user. The storage control means restores a state at the time of game termination by the game execution means and stores in a storage means hibernation data as interruption information allowing resumption of the game processing in conformity with the temporary interruption command from the user.

The present invention allows easy interruption and resumption of a game in progress at arbitrary times.

DESCRIPTION OF REFERENCE NUMERALS

2: game apparatus, 10: television monitor device, 20: controller, 30: CPU, 31: GPU, 47: HDD, 101: game execution unit, 102: storage control unit, 103: setting change unit, 104: display control unit, 105: internal battery, 106: battery residual quantity determination unit, 107: storage unit

DETAILED DESCRIPTION OF THE INVENTION

[General Structure of System of the Embodiment]

Figure 1:
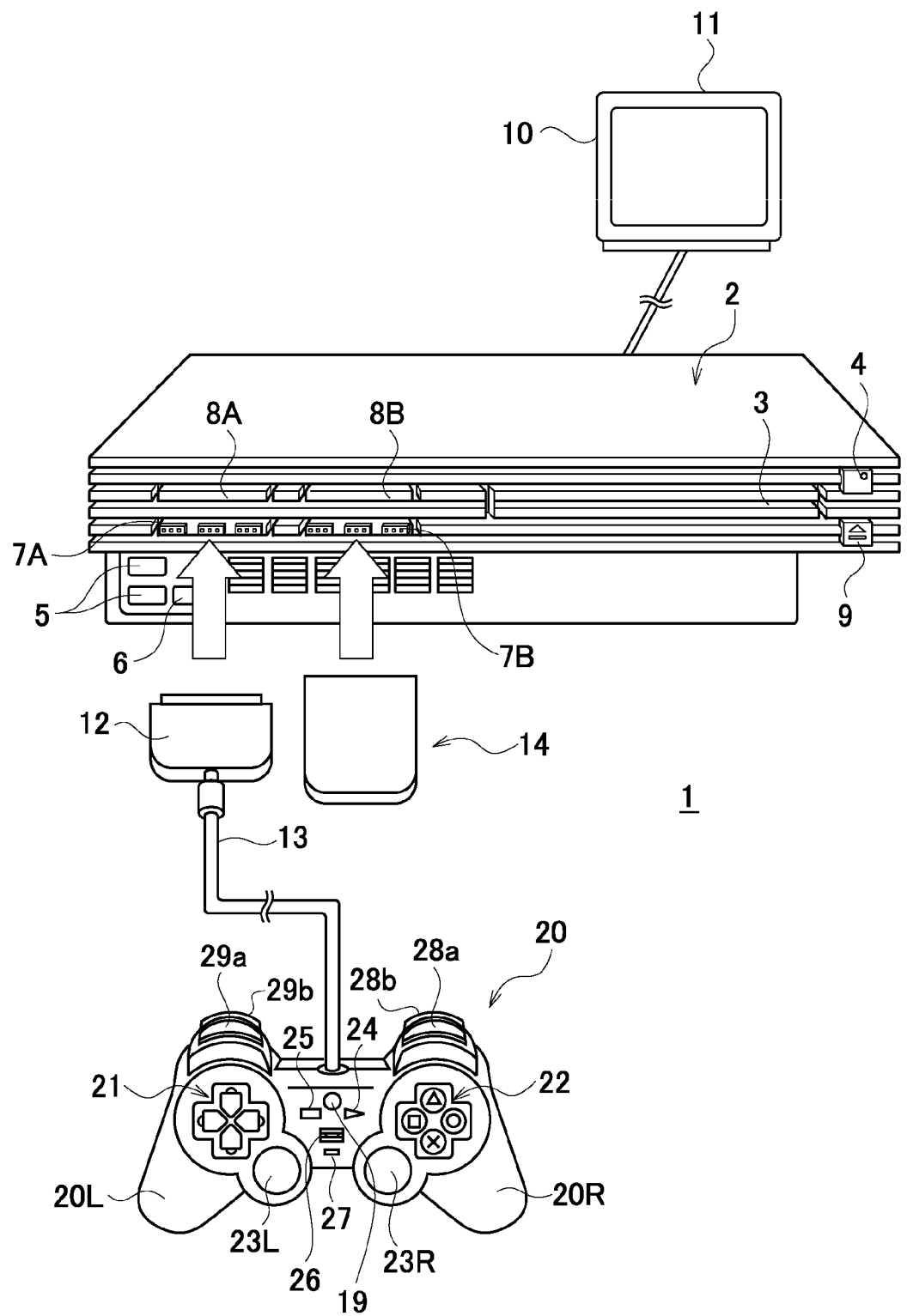
FIG. 1 is a diagram schematically showing an entire system including a game apparatus according to an embodiment of the present invention.

FIG. 1 schematically shows a system of an embodiment. This system 1 is constituted by a game apparatus 2, a controller 20 as an input device (input means) connected to the game apparatus 2 and operated by a user (player), and a television monitor device (monitor device) 10 as a display unit (display means) for sound output or display of a game screen or input letters, symbols, and the like. The game apparatus 2 is a compound device (multimedia reproducing device) capable of reproducing or executing multiple contents such as still images, moving images, music, broadcast, games, and the like.

The game apparatus 2 includes memory card slots 8A and 8B, controller ports 7A and 7B, a disk tray 3, buttons 4 and 9, an IEEE (Institute of Electrical and Electronics Engineers) 1394 connection terminal 6, a USB (Universal Serial Bus) connection terminal 5, and the like. The memory card slots 8A and 8B are structured such that a memory card 14 may be inserted/ejected. The controller ports 7A and 7B are structured such that a connector 12 of a cable 13 connected to the controller 20 may be inserted/ejected. The disk tray 3 is structured such that an optical disk such as a DVD-ROM, CD-ROM, or the like may be loaded therein. The button 9 is a button for opening and closing the disk tray 3. The button 4 is a button for switching a power supply on or into standby, or resetting a game. Moreover, although omitted from the drawing, a power switch, an acoustic imaging output terminal (AV multi-output terminal), a PC card slot, an optical digital output terminal, a hard disk drive insert, an AC power input terminal, and the like are provided on a backside of the game apparatus 2.

The game apparatus 2 executes various processing including games based on an application program read out from an optical disk such as a CD-ROM or DVD-ROM or a storage medium such as a semiconductor memory or the like, and an instruction from the user via the controller 20. In addition, the game apparatus 2 may also execute a game or the like based on an application program downloaded via various communication lines (transmission media) such as a telephone line, LAN, a CATV line, a communications satellite line, or the like.

The controller 20 is connectable to the respective controller ports 7A and 7B of the game apparatus 2. Moreover, the game apparatus 2 may store various game data in the memory card 14 loaded in either of the memory card slots 8A and 8B.

Note that the game apparatus 2 is also capable of reproducing, for example, audio data recorded on a CD, and video and audio data such as a movie recorded on a DVD, or the like. Furthermore, the game apparatus 2 is also capable of operating based on various application programs aside from games.

Communication between the controller 20 and the game apparatus 2 may be wireless communication or wire connected communication via the cable 13.

Alternatively, it may be a portable game device to which an input unit and a display unit are integrated with the game device.

[General Description of Controller]

Figure 2:
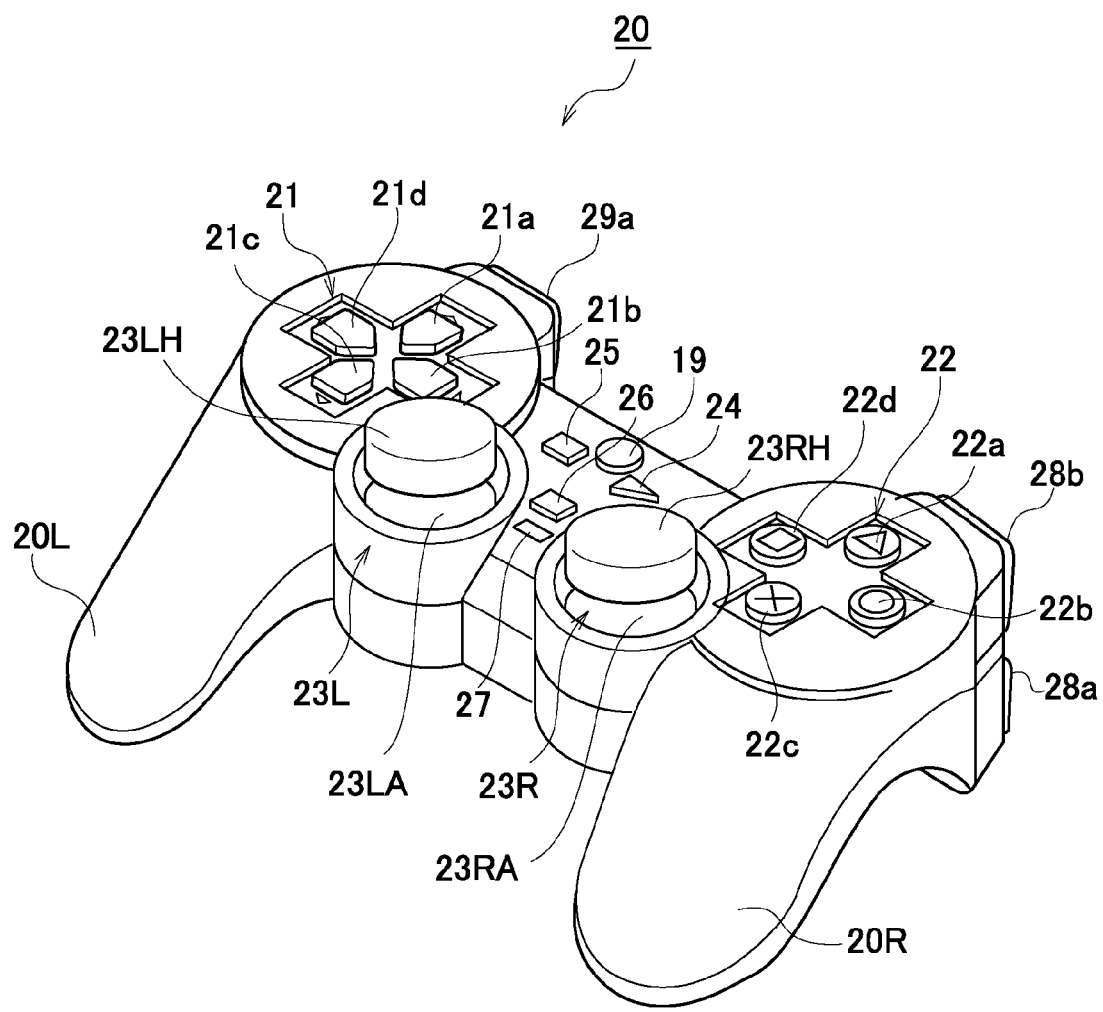
FIG. 2 is an exterior oblique perspective of a controller.

The controller 20, as shown in FIG. 1 and FIG. 2, includes a left grip 20L, a right grip 20R, a left operation part 21, a right operation part 22, a left stick 23L, a right stick 23R, an L1 button 29a, an L2 button 29b, an R1 button 28a, an R2 button 28b, a home button 19, and other related parts.

The left operation part 21 has directional command buttons (cross keys) 21a, 21b, 21c, and 21d, which are stamped with upward, rightward, downward, and leftward marks, respectively. These directional command buttons 21a, 21b, 21c, and 21d are arranged in a cross shape, up and down and left and right, which correspond to the command directions. The user performs an on operation by pressing the directional command buttons 21a, 21b, 21c, and 21d using the left thumb when moving an object such as a game character on a screen, for example. Moreover, the directional command buttons 21a, 21b, 21c, and 21d are used not only for up, down, left and right commands, but also for diagonal directional commands. The user may give the game apparatus 2 a right upward command by simultaneously depressing the directional command buttons 21a and 21b, for example. Similar operations will apply for the other directional command buttons, where the user may give the game apparatus 2 a left downward command by simultaneously depressing the directional command buttons 21c and 21d, for example.

Furthermore, the right operation part 22 has four command buttons 22a, 22b, 22c, and 22d, which are allotted different functions in accordance with respective application programs. Of these command buttons, a triangle display button 22a has a triangle mark on the surface, a circle display button 22b has a circle mark on the surface, an X-mark display button 22c has an X-mark on the surface, and a square display button 22d has a square mark on the surface.

The left stick 23L includes a tilt operation part 23LH, which is capable of tilt operations up to a predetermined angle in arbitrary directions and orbit operations while tilted at only a desired angle, moving around an operational axis 23LA. Similarly, the right stick 23R includes a tilt operation part 23RH, which is capable of tilt and orbit operations, moving around an operational axis 23RA. Furthermore, the tilt operation part 23LH is attached on the end side of the operational axis 23LA, which is attached so as to return to a neutral position due to a flexible member, and that position (reference position) is maintained in an erect state (non-tilted state, referred to as neutral state hereafter) when there is no tilt operation by the user. Similarly, the tilt operation part 23RH is attached on the end side of the operational axis 23RA, and that position is maintained in the neutral state when there is no tilt operation by the user. In other words, the left stick 23L and the right stick 23R are respectively capable of a tilt operation in any direction 360 degrees around the reference position, and include an operational freedom allowing an orbit operation also in any direction 360 degrees around the operational axes 23LA and 23RA, respectively, in a tilted state. The left stick 23L and the right stick 23R include a variable analog value output means (omitted from the drawing) for outputting variable analog values in accordance with tilt and orbit operations of the tilt operation parts 23LH and 23RH, respectively. The variable analog value output means includes a variable resistive element, for example, where resistance value of the variable resistive element changes according to tilt or orbit operation of the tilt operation parts 23LH and 23RH, respectively. When tilting the tilt operation parts 23LH and 23RH of the left stick 23L and 23R, respectively, the coordinate values on the XY coordinates in the tilt direction and the amount of tilt from the reference position are detected, and the coordinate values are transmitted to the game apparatus 2 as operation output.

Moreover, the controller 20 includes a function selecting switch 26, a lighting display 27, a select button 25, a start button 24, a home button 19, and related parts. The function selecting switch 26 is a switch for selecting an operation function of operating or stopping functions of the left and right operation parts 21 and 22 and the left and right sticks 23L and 23R. The lighting display 27 includes a light emitting diode (LED) or the like for the user to recognize the selected operation function. The start button 24 is a button for the user to give a command such as start execution of an application program. The select button 25 is a button for the user to command display or the like of a menu or similar image on the monitor screen 11 of the monitor device 10. The home button 19 is a button for the user to give a command for interrupting or terminating an application program, etc. Note that alternatively, interruption or termination of an application program may be allotted to another button (e.g., the start button 24).

If the various buttons on the controller 20 or the left and right sticks 23L and 23R are operated by the user, the controller 20 generates an operation signal in accordance with those operations, and sends that operation signal to the game apparatus 2 via the cable 13, the connector 12, and the controller port 7. For example, if the user presses a certain button, the controller 20 sends to the game apparatus 2 an ON signal corresponding to the pressed button as an operation signal (operation status signal), and the game apparatus 2 then recognizes based on the operation signal received from the controller 20 which of the various buttons on the controller 20 has been pressed.

[Functional Structure of Game Apparatus]

Figure 3:
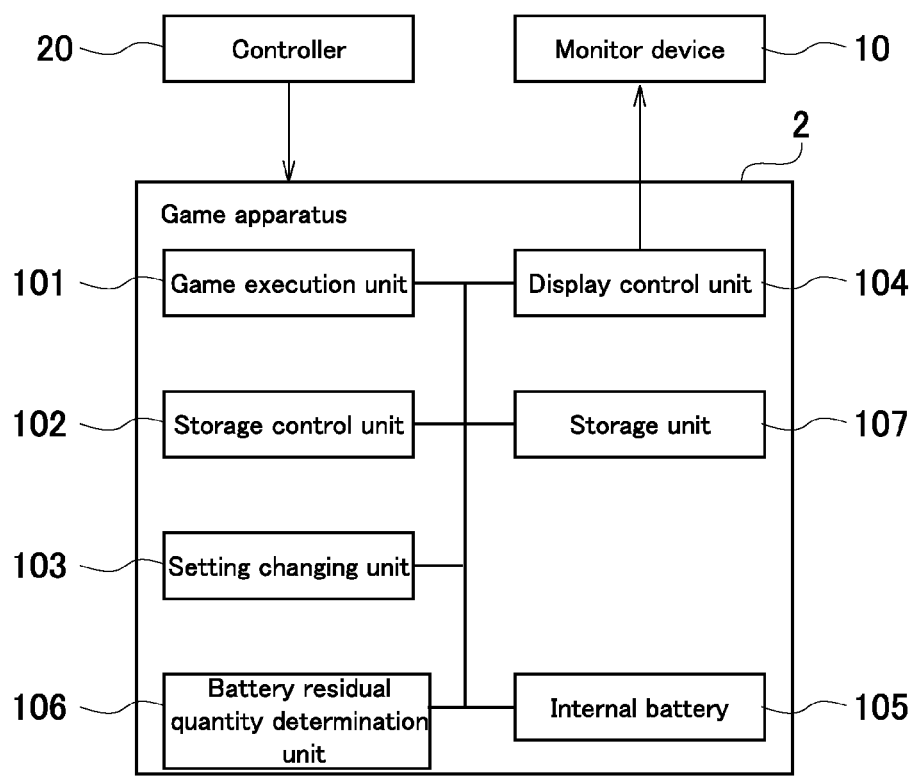
FIG. 3 is a block diagram illustrating a functional configuration of the game apparatus.

Next, a functional structure of the game apparatus 2 is described referring to FIG. 3.

The game apparatus 2 includes a game execution unit 101, a storage control unit 102, a setting change unit 103, a display control unit 104, an internal battery 105, a battery residual quantity determination unit 106, and a storage unit 107. The game apparatus 2 receives a command (operation signal) from the user via the controller 20 in the aforementioned manner, and the game execution unit 101, the storage control unit 102, the setting changing unit 103, and the display control unit 104 then execute the following processing according to the received command.

The game execution unit 101 reads out a game program from the storage unit 107 based on the command from the user, and executes game processing in conformity with predetermined setup information including the read out game program. The display control unit 104 displays on the monitor device 10 a game screen in compliance with the game processing.

Figure 8:
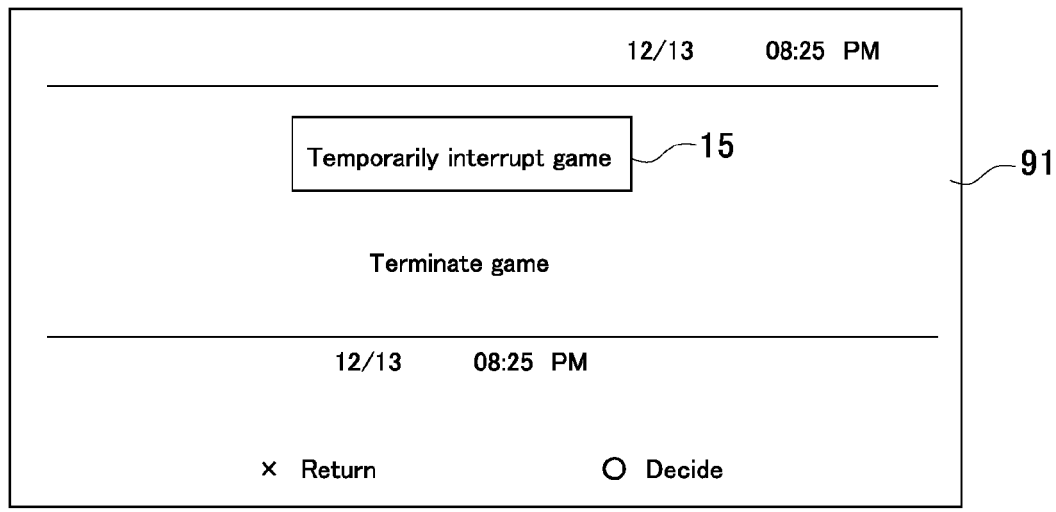
FIG. 8 is a diagram illustrating a game termination confirmation screen.

If the game execution unit 101 receives a game termination selection command from the user while executing the game processing, the display control unit 104 displays a game termination confirmation screen 91 (shown in FIG. 8) on the monitor device 10. The game termination confirmation screen 91 is a screen for requesting the user to select either a temporary interruption command for terminating a game that may be resumed from the state at the time of game termination, or a normal termination command for terminating a game that cannot be resumed from the state at the time of game termination.

If either the temporary interruption command or the normal termination command is received from the user, the game execution unit 101 terminates the game processing in progress. On the other hand, the storage control unit 102, if the temporary interruption command is received from the user, stores in the storage unit 107 hibernation data as interruption information, which allows the game execution unit 101 to restores the state at the time of game termination and then resume the game processing.

Figure 13:
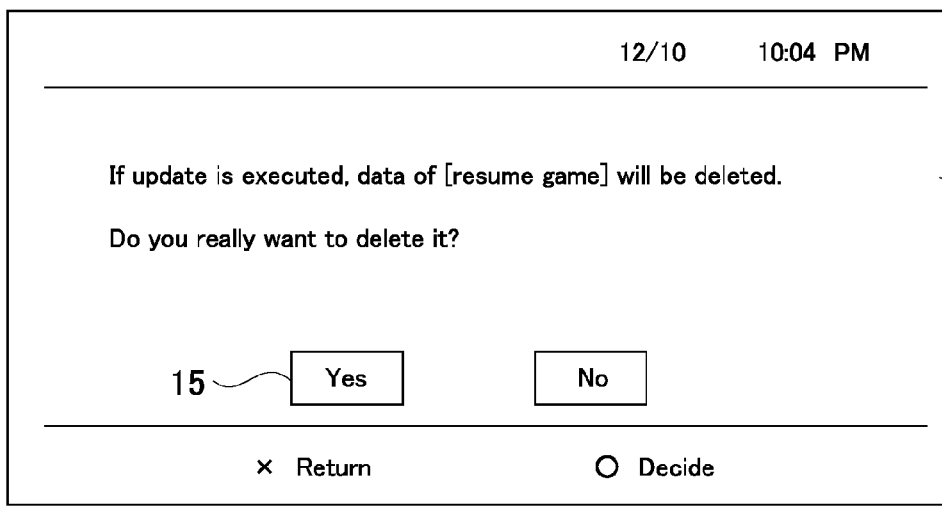
FIG. 13 is a diagram illustrating a data deletion confirmation screen.

If a change command is received from the user, the display control unit 104 displays a data deletion confirmation screen 95 (shown in FIG. 13) on the monitor device 10. The data deletion confirmation screen 95 is a screen for requesting the user to select either a command for deletion authorization of the interruption information stored in the storage unit 107 or a command for deletion refusal of the same.

If the command for deletion authorization is received from the user after the change command has been received from the user, the setting changing unit 103 changes predetermined setting information for the game execution unit 101 to execute the game processing. In the case where the change command from the user is an update command for the game program, the setting changing unit 103 updates the game program stored in the storage unit 107. The storage control unit 104 then deletes the interruption information stored in the storage unit 107 once the setting information is changed by the setting changing unit 103.

On the other hand, when the deletion refusal selection command is received from the user, the setting changing unit 103 maintains the setting information as is.

Figure 10:
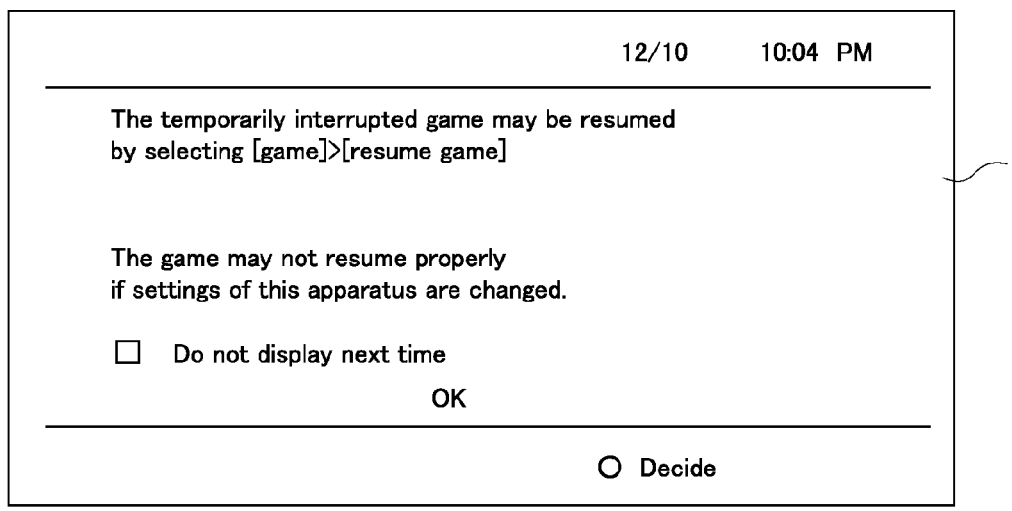
FIG. 10 is a diagram illustrating a hibernation guide.

The display control unit 104 then displays on the monitor device 10 a hibernation guide 94 (shown in FIG. 10) at a predetermined time. The hibernation guide 94 is a screen for notifying to the effect that the game execution unit 101 may not be able to resume the game processing based on the interruption information if the setting information is changed.

The battery residual quantity determination unit 106 monitors the residual quantity of the internal battery 105, and determines whether or not it is a predetermined quantity or less. If the battery residual quantity determination unit 106 determines that the residual quantity of the internal battery 105 is the predetermined quantity or less, the storage control unit 102 stores the interruption information in the storage unit 107, and the game execution unit 101 terminates the game processing in progress.

[Internal Circuit Structure of Game Apparatus]

Figure 4:
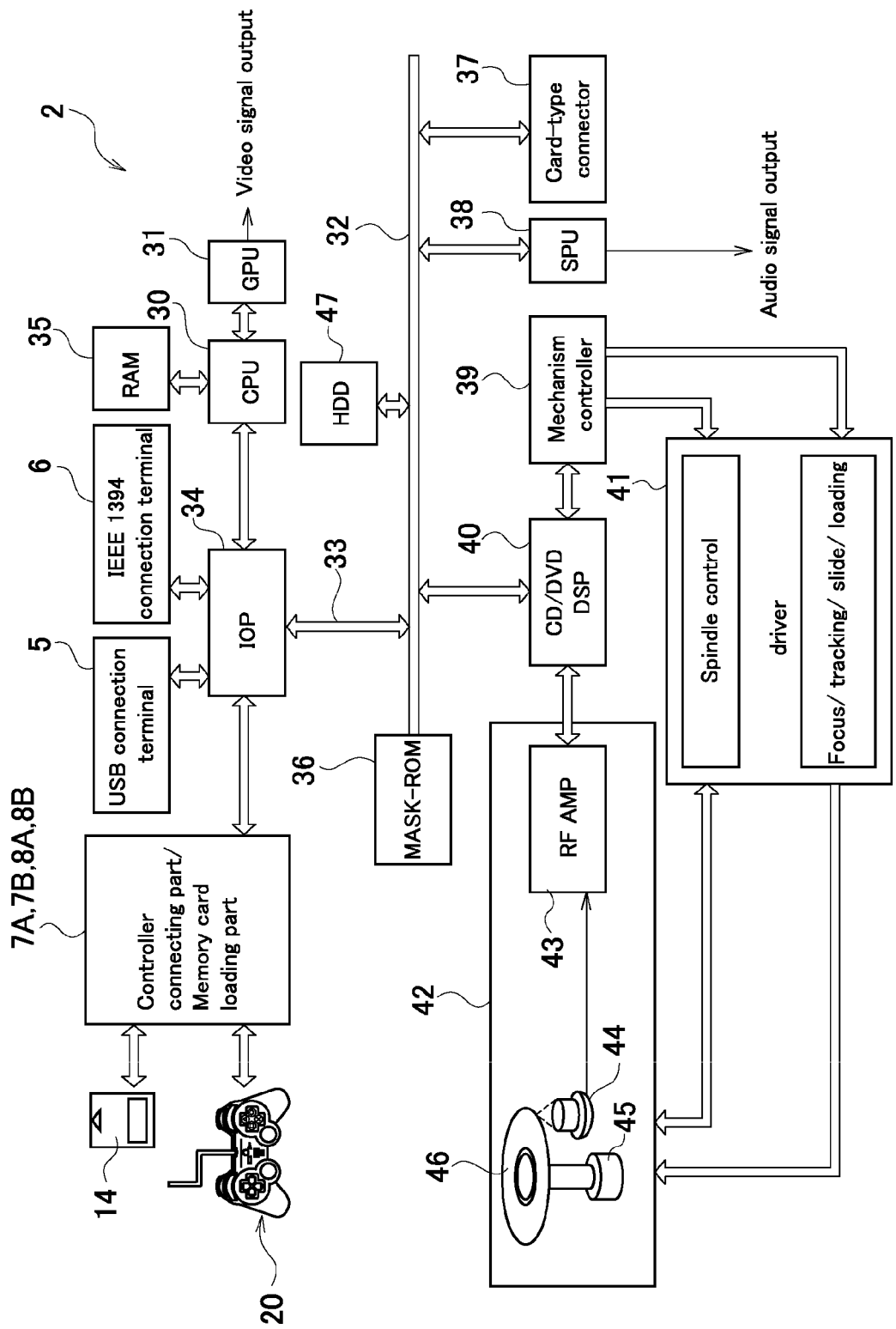
FIG. 4 is a block diagram illustrating an internal circuit structure of the game apparatus.

Next, a summary of an internal circuit structure capable of the respective functions of the game apparatus 2 is described referring to FIG. 4.

The game apparatus 2 includes a CPU 30, a graphic processor unit (referred to as GPU hereafter) 31, an IO processor (referred to as IOP hereafter) 34, an optical disk reproducing unit 42, main memory (RAM: Random Access Memory) 35, MASK-ROM 36, a sound processor unit (referred to as SPU hereafter) 38, an internal hard disk drive unit (referred to as HDD hereafter) 47, and related units. The CPU 30 functions as the game execution unit 101, the setting changing unit 103, and the battery residual quantity determination unit 106. The GPU 31 functions as the display control unit 104. The HDD 47 functions as the storage unit 107.

The CPU 30 carries out signal processing and control of internal components based on various application programs allowing execution of a video game or the like. The GPU 31 carries out image processing. The IOP 34 carries out interface processing between the outside and inside of the apparatus and processing for maintaining backward compatibility. The main memory 35 has a function as a buffer temporarily storing data read out from the optical disk 46 or a work area of the CPU 30. The HDD 47 functions as a storage region for various programs and various data. Note that in the following description, a unique program to the game apparatus 2, which is not an application program, is stored in the MASK-ROM 36 and the HDD 47, and is read out and executed by the CPU 30, is referred to as a system program so as to differentiate from an application program such as a game program.

The MASK-ROM 36 is stored with, for example, an initial setting program of the game apparatus 2 and a program (namely, a handler) for temporarily interrupting the processing of the CPU 30 and the IOP 34 when various switches and buttons are pressed and then executing processing in accordance with the operations of those switches and buttons.

The SPU 38 carries out acoustic signal processing. The optical disk reproducing unit 42 reproduces an application program or multimedia data recorded on an optical disk 46 such as a DVD, DVD-ROM, CD, CD-ROM or the like. Moreover, the optical disk reproducing unit 42 is constituted by a spindle motor 45, an optical pickup 44, an RF amplifier 43, a slide mechanism, and the like. The spindle motor 45 rotates the optical disk 45 such as a DVD, CD, or the like. Furthermore, the spindle motor 45 is provided with a velocity sensor for detecting rotating velocity. The optical pickup 44 reads a signal recorded on the optical disk 46. The slide mechanism moves the optical pickup 44 along the disk radially. The RF amplifier 43 amplifies an output signal from the optical pickup 44.

In addition, the game apparatus 2 has a CD/DVD digital signal processor (referred to as DSP hereafter) 40, a driver 41, a mechanism controller 39, and a card-type connector (referred to as PC card slot hereafter) 37. The DSP 40 reproduces a signal stored on the optical disk 46 by digitizing an output signal from the RF amplifier of the optical disk reproducing unit 42 and carrying out error correction (CIRC), expanding and decoding, and similar processing, for example. The driver 41 and the mechanism controller 39 carry out rotation control of the spindle motor 45 of the optical disk reproducing unit 42, focus/tracking control of the optical pickup 44, loading control of the disk tray 3, and the like. The PC card slot 37 is an interface device for connecting to a communication card, an external hard disk drive, or the like, for example.

These respective parts are primarily connected to each other via bus lines 32 and 33. Note that the CPU 30 and the GPU 31 are connected via a dedicated bus. Moreover, the CPU 30 and the IOP 34 are connected via an SBUS. The IOP 34, the DSP 40, the MASK-ROM 36, the SPU 38, and the PC card slot 37 are connected via an SSBUS.

The CPU 30 controls all operations of the game apparatus 2 through execution of the initial setting program and the like stored in the MASK-ROM 36 and an operating system program for the CPU read out from the optical disk 46. The CPU 30 also controls various operations of the game apparatus 2 through execution of various application programs such as a game program. The various application programs are stored in the optical disk 46, the HDD 47, the RAM 35, and the like, and are read out from these storage means and downloaded to the main memory 35. The application programs stored in the HDD 47 and the RAM 35 include those downloaded via a communication network. Furthermore, when update programs are provided for the system program and the application programs for version upgrade and the like, the game apparatus 2 (CPU 30) acquires the update programs from an optical disk or through downloading via a network in response to a command from the user. The CPU 30 stores the acquired update programs in the HDD 47, for example. It updates the currently stored system program or the application programs in conformity with the acquired update programs in response to an update execution command from the user. The CPU 30 then executes processing in accordance with the updated programs when executing the system program and the application programs.

The IOP 34 controls data input and output between the game apparatus 2 and a PAD/memory card connector constituted by the controller ports 7A and 7B and the memory card slots 8A and 8B, data input and output between the game apparatus 2 and the USB connection terminal 5, data input and output between the game apparatus 2 and the IEEE 1394 connection terminal 6, and data input and output between the game apparatus 2 and the PC card slot 37, and carries out data protocol conversion thereof through execution of the operating system program for the IO processor stored in the MASK-ROM 36. Note that a device ID for the game apparatus 2 is also stored in the MASK-ROM 36.

The GPU 31 functions as a geometry transformation engine for executing processing such as coordinate conversion or the like, and as a rendering processor, and renders in response to a render command from the CPU 30 and stores the rendered image in a frame buffer of the main memory 35. When various application programs recorded on the optical disk 46, for example, utilize three-dimensional (3D) graphics as in a video game, the GPU 31 carries out coordinate calculation and related calculations of polygons for configuring a 3D object through a geometry operation, carries out a variety of calculations, namely perspective transformation (calculation of coordinate values when vortices of respective polygons constituting a 3D object are projected onto a virtual camera screen, or the like) for generating an image obtained by photographing this 3D object using a virtual camera (virtual camera for determining a virtual field of view) through rendering, and then writes the finally obtained image data on the frame buffer. The GPU 31 then outputs a video signal corresponding to the created image.

The SPU 38 includes an adaptive differential pulse code modulation (ADPCM) decoding function, an audio signal reproducing function, a signal modulating function, and similar functions. The ADPCM decoding function is a function for decoding acoustic data that has been adaptive predictive coded. The audio signal reproducing function is a function for reproducing and outputting an audio signal such as a sound effect by reading out waveform data from an internal or external sound buffer of the SPU 38. The signal modulating function is a function for modulating the waveform data stored in the sound buffer so as to generate various waveform data. In other words, the SPU 38 also generates an audio signal such as music or a sound effect from the waveform data stored in the sound buffer based on a command from the CPU 30, namely operates as a sampling sound generator.

When the game apparatus 2 structured in the above manner is turned on, the initial setting program for the CPU and the operating system program for the IOP are read out from the MASK-ROM 36, and corresponding programs thereto are executed by the CPU 30 and the IOP 34. As a result, the CPU 30 controls each part of the game apparatus 2. Moreover, the IOP 34 controls input and output of a signal between the game apparatus 2 and the controller 20, the memory card 14, or the like. After the CPU 30 executes initialization processing such as operation confirmation and the like, it controls the optical disk reproducing unit 42, reads out an application program from the optical disk 46, loads it into the main memory 35, and then executes that application program. Through the execution of this application program, the CPU 30 controls the GPU 31 and the SPU 38 so as to control display of an image or textual information and generation of sound effects and music in conformity with a command from the user using the controller 20 via the IOP 34. Note that the case of reproducing a movie or the like recorded on the optical disk, for example, in the game apparatus 2 is the same, where the CPU 30 controls the GPU 31 and the SPU 38 so as to control display of images of the movie reproduced from the optical disk 46 and generation of sound effects and music in conformity with a command from the user using the controller 20 via the IOP 34.

[Hibernation Data]

The game execution unit 101 and the storage control unit 102 execute temporary interruption processing in response to a temporary interruption command from the user. In the temporary interruption processing, the storage control unit 102 stores in a hibernation storage region of the storage unit 107 (HDD 47) hibernation data allowing resumption of the game processing through restoration of the state at the time when the game execution unit 101 terminated the game, and the game execution unit 101 then terminates the game processing in progress.

The storage control unit 102 stores all data (all hardware information of the system) of the main memory 35 as hibernation data in the hibernation storage region of the HDD 47 when terminating the game (interruption point). Moreover, by the storage control unit 102 reconstructing the stored hibernation data and then storing the reconstructed data in the main memory 35, the state of the system at the time of game termination is restored, and the game execution unit 101 resumes the game processing from the interrupted point. Note that the hibernation data of this embodiment includes information specifying date and time of game termination (temporary interruption).

The temporary interruption processing is processing executed in conformity with the system program of the game apparatus 2, and is executed in response to a temporary interruption command from the user entered at an arbitrary time. Since the input operation of the temporary interruption command corresponds to the system program of the game apparatus 2, the temporary interruption processing is executed in response to a fixed operation (for example, pressing of the home button 19) irrespective of the type of game program in progress.

Furthermore, in the case of storing the hibernation data when power of the system is off in power-saving mode or the like, for example, and restoring the system to the power-off state using the hibernation data when the power is on, the state of the system from when the hibernation data is stored to time of use is unchanged, and there is no trouble in restoration based on the hibernation data.

Meanwhile, the hibernation data of this embodiment is not stored subject to the power-off state of the system, and the CPU 30 may execute processing in conformity with a command from the user after the hibernation data is stored. In other words, change in the state of the system (predetermined setting information for the game execution unit 101 to execute the game processing) is allowed between when the hibernation data is stored and time of use, and change in the above determined setting information may cause erroneous restoration (no resuming of the game) based on the hibernation data, and resulting in a chance of freezing. Change in the predetermined setting information includes, for example, update of the game program according to an update program, change in settings (e.g., changing of set time) of the game apparatus 2, update of the system program, and the like.

It is accordingly favorable that settings of the game apparatus 2 at the time of storing the hibernation data and at the time of use are exactly the same in order to surely resume the game in conformity with the hibernation data. Therefore, in this embodiment, the storage region for the hibernation data is not a storage medium (e.g., the memory card 14) that may be inserted/ejected in to/out of the game apparatus 2 and connectable to other game apparatus, but is set up in the internal HDD 47 of the game apparatus 2, thereby restricting common use of the hibernation data among multiple game apparatus.

Alternatively, just one hibernation data may be storable in a single game apparatus 2, or multiple hibernation data may be storable. When multiple hibernation data is storable, just one hibernation data may be storable per game program, or multiple hibernation data may be storable.

[Save Data]

The game execution unit 101 executing game processing in conformity with a game program stores save data in a memory card or the HDD 47 in response to a save command from the user or a save command preset in the game program.

The save data is information allowing resumption of the game processing from a save point through restoration of the state at the saved point.

Processing for storing the save data is executed in accordance with the game program. Therefore, whether or not the save data may be generated at an arbitrary time in conformity with a command from the user, and whether or not to carry out an operation input such as a save data generation command depend on the game program in progress. Ordinarily, an update program for the game program is created in view of the save data. Therefore, the storage region for the save data has little need to be limited to an internal storage means of the game apparatus 2, where it may be set in the removable memory card 14 in this embodiment.

[Basic Structure of Menu Screen]

Next, a menu screen is described. The menu screen is displayed on the monitor screen 11 by the CPU 30 (game execution unit 101), the IOP 34, and the GPU 31 (display control unit 104) executing menu screen display processing in accordance with the system program when, for example, starting up the game apparatus 2.

Figure 5:
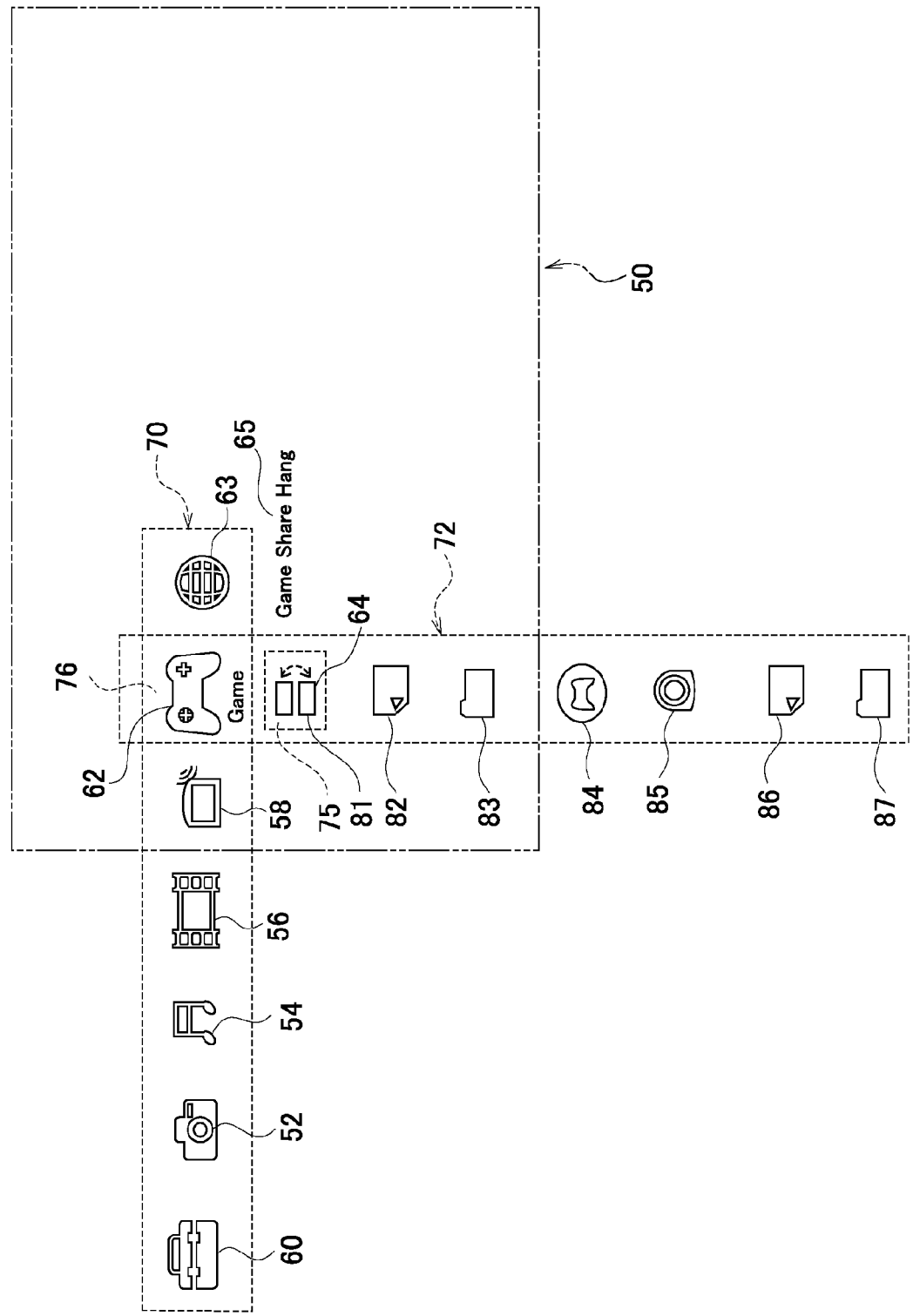
FIG. 5 is a diagram illustrating a menu screen.

As shown in FIG. 5, a two-dimensional array where a functional icon array 70 in which multiple functional icons are horizontally lined up, and a first icon vertical array 72 in which multiple folder icons and content icons are vertically lined up cross each other on the menu screen 50. The functional icon array 70 includes a photo icon 52, a music icon 54, a moving image icon 56, a broadcast icon 58, a game icon 62, a setting icon 60, and a network icon 63.

A functional icon arranged in a region (cross region 76) crossed by the functional icon array 70 and the first icon vertical array 72 is enlarged and displayed in a different color than other functional icons. The cross region 76 is positioned in a predetermined place (upper left part in this example) on the menu screen 50 and kept unchanged, the entire functional icon array 70 is moved left or right in response to a left or right command (for example, press the directional command buttons 21a, 21b, 21c, or 21d) from the user using the controller 20, and color and size of a functional icon positioned in the cross region 76 are changed. Therefore, a desired reproducing function can be selected by the user merely giving a directional command of left or right, and a determination command such as a click operation of a mouse normally performed on a PC, for example, is unnecessary.

The display control unit 104 scrolls the entire functional icon array 70 to the left or right so as to move the functional icons left or right. Each of the functional icons is displayed with the same color and size while moving left and right, and color and size of the functional icon positioned in the cross region 76 are changed.

If any one of the functional icons is positioned in the cross region 76, the first icon vertical array 72 is expanded vertically such that it extends out from the cross region 76.

A target region 75 positioned at a predetermined location (directly below the cross region 76 in this example) on the menu screen 50 is a region in which a target content or folder icon for an operation by the user should be displayed, and that position is kept unchanged at the predetermined location on the menu screen 50. The target region 75 constitutes a part of the first icon vertical array 72, and the display control unit 104 displays the content icon positioned in the target region 75 as a target icon 64 with different aspects than the other icons. For example, the target icon 64 is enlarged so that the other content icons are displayed smaller than the target icon 64. Information 65 corresponding to the target icon 64 is displayed near (on the right side in this embodiment) the target icon 64.

While the game apparatus 2 is receiving an up or down command from the user via the controller connection unit 7A, the display control unit 104 scrolls the entire first icon vertical array 72 up or down in conformity with that command. Each of the icons in the first icon vertical array 72 is displayed with the same size while moving up and down, and only the content icon positioned in the target region 75 is enlarged as the target icon 64.

If the game apparatus 2 receives a reproduction decision command (e.g., press the circle display button 22b or press the start button 24) for the content displayed as the target icon 64 from the user via the controller connection unit 7A, the display control unit 104 hides the image data of the menu screen 50, and the CPU 30 controls to start reproduction of the selected content. If the user commands (e.g., press the select button 25) to call up the menu screen 50 during content reproduction (e.g., during reproduction of a moving image stored in the HDD 47), the menu screen 50 is overlapped on the screen for the reproduced content. State of when reproduction of the content is decided is restored on this displayed menu screen 50.

If the game apparatus 2 receives from the user a selection decision command (e.g., press the circle display button 22b) in a state where a folder icon in the first icon vertical array 72 is positioned in the target region 75, the entire functional icon array 70 and the first icon vertical array 72 are moved to the left, functional icons on the right side of the cross region 76 of the functional icon array 70 are hidden, and a second icon vertical array (omitted from the drawing) is expanded vertically such that it extends out from the target region 75. The second icon vertical array also moves vertically in its entirety in response to an up or down command from the user while receiving that command so that the icon positioned in the target region 75 is replaced as a result of this movement.

Note that when there are icon vertical arrays further underlying the second icon vertical array, the underlying icon vertical arrays are displayed successively in the same manner in conformity with a command from the user.

The game icon 62 is an icon symbolizing a game execution function, and is selected in the case of executing a game program. The underlying first icon vertical array 71 of the game icon 62 includes an icon 81, which symbolizes a game sharing function, an icon 82 (external memory save data folder icon), which symbolizes a storage folder for save data in the memory card 14, an icon 83 (main body memory save data folder icon), which symbolizes a storage folder for save data in the HDD 47, an icon 84 (hibernation data icon), which symbolizes hibernation data, an icon 85 (optical disk icon), which symbolizes the optical disk 46, an icon 86 (external memory game icon), which symbolizes a storage folder for a game program in the memory card 14, and an icon 87 (main body memory game icon), which symbolizes a storage folder for a game program in the HDD 47. Note that in the case where a game program stored in the optical disk 46 includes a game icon as data, the display control unit 104 displays that icon as the optical disk icon 85, and displays information such as title of the game program as the information 65 regarding contents of the optical disk icon 85.

The following processing is executed in the case where an execution decision command (e.g., press the circle display button 22b or the start button 24) is entered using the controller 20 such that the game apparatus 2 receives the execution decision command from the user, or the case where a selection decision command (e.g., press the circle display button 22b) is entered using the controller 20 such that the game apparatus 2 receives the selection decision command from the user in a state (icon selected state) where the user has positioned a desired icon in the target region 75.

For example, in compliance with an execution decision command in a state where the optical disk icon 85 has been selected, the game execution unit 101 reads out the game program stored in the optical disk 46 and executes game processing in accordance with the read out game program.

In compliance with a selection decision command in a state where the external memory game icon 86 has been selected, the display control unit 104 moves the entire functional icon array 70 and the first icon vertical array 72 to the left, hides functional icons on the right side of the cross region 76 of the functional icon array 70, and vertically expands the icon (game display icon) symbolizing the game program stored in the memory card 14 as the second icon vertical array such that it extends out from the target region 75. Moreover, in the case of a selection decision command in a state where the main body memory game icon 87 has been selected, the display control unit 104 also vertically expands the icon (game display icon) symbolizing the game program stored in the HDD 47 as the second icon vertical array such that it extends out from the target region 75. Furthermore, in compliance with an execution decision command in a state where the game display icon has been selected, the game execution unit 101 reads out the game program stored in the HDD 47 and executes game processing in accordance with the read out game program. Note that when the game program stored in the memory card 14 or the HDD 47 includes a game icon as data, the display control unit 104 displays that icon as the game display icon.

In compliance with a selection decision command in a state where the external memory save data folder icon 82 has been selected, the display control unit 104 moves the entire functional icon array 70 and the first icon vertical array 72 to the left, hides functional icons on the right side of the cross region 76 of the functional icon array 70, and vertically expands the icon (save data display icon) symbolizing save data of the game stored in the memory card 14 as the second icon vertical array such that it extends out from the target region 75. Similarly, in the case of a selection decision command in a state where the main body memory save data folder icon 83 has been selected, the display control unit 104 also vertically expands the icon (save data display icon) symbolizing the save data of the game stored in the HDD 47 as the second icon vertical array such that it extends out from the target region 75. Note that when the save data of the game stored in the memory card 14 or the HDD 47 includes a game icon as data, the display control unit 104 displays that icon as the save data display icon. Furthermore, in contrast to the case where the hibernation data icon 84 has been selected, which is described later, the game is not resumed even when the user enters an execution decision command in a state where the save data display icon has been selected, but resumption of the game from the saved point corresponding to the save data is executed through input of an execution decision command by the user so as to start the game in a state where the game display icon has been selected and then through a predetermined input in accordance with the game program.

Figure 6:
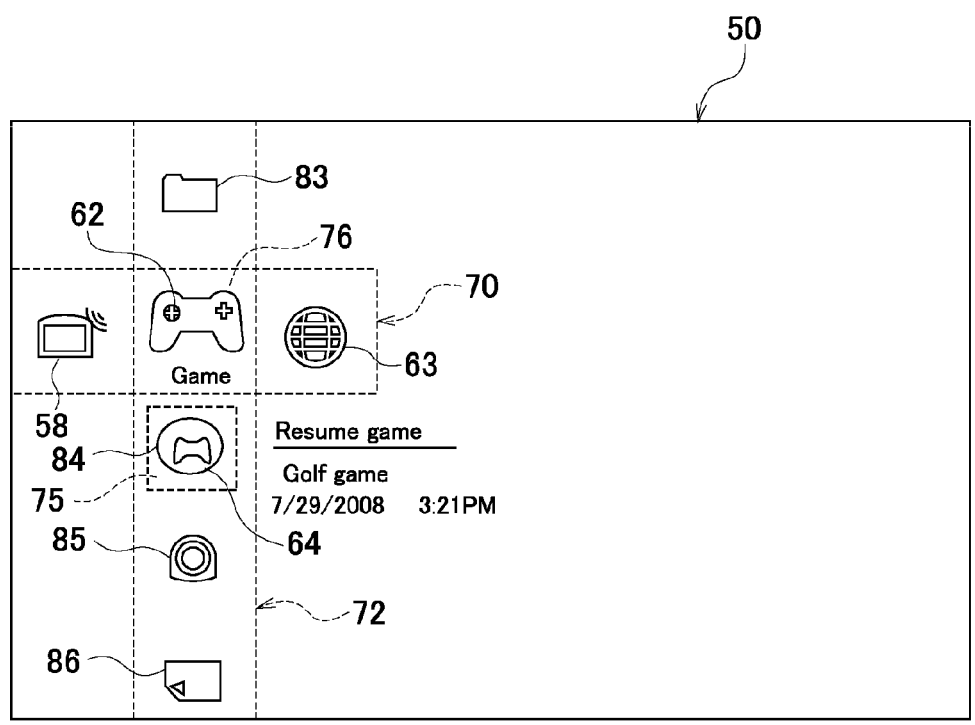
FIG. 6 is a diagram illustrating a menu screen.

If the hibernation data icon 84 is selected, the display control unit 104 displays a text 'resume game' and attribute information of the hibernation data to the right of the hibernation data icon 84, as shown in FIG. 6. The attribute information includes title and time and date of interruption of the game.

In response to an execution decision command in the state where the hibernation data icon 84 has been selected, the storage control unit 102 reconstructs the hibernation data stored in the hibernation storage region of the HDD 47 and then stores the reconstructed data in the main memory 35, and the game execution unit 101 then resumes the game processing from the interrupted point. Note that the display control unit 104 may display as the hibernation data icon the reconstructed image, which results from reconstructing the image obtained at the time of an interruption using the hibernation data.

The setting icon 60 is an icon symbolizing various setting functions, and should be selected in the case of changing various settings of the game apparatus 2.

The network icon 63 is an icon symbolizing a network selecting function, and should be selected in the case of reproducing content input via the Internet 35, or the case of executing an application such as a web browser or the like.

[Termination, Temporary Interruption, and Resumption of Game in Conformity with System Program]

Figure 7:
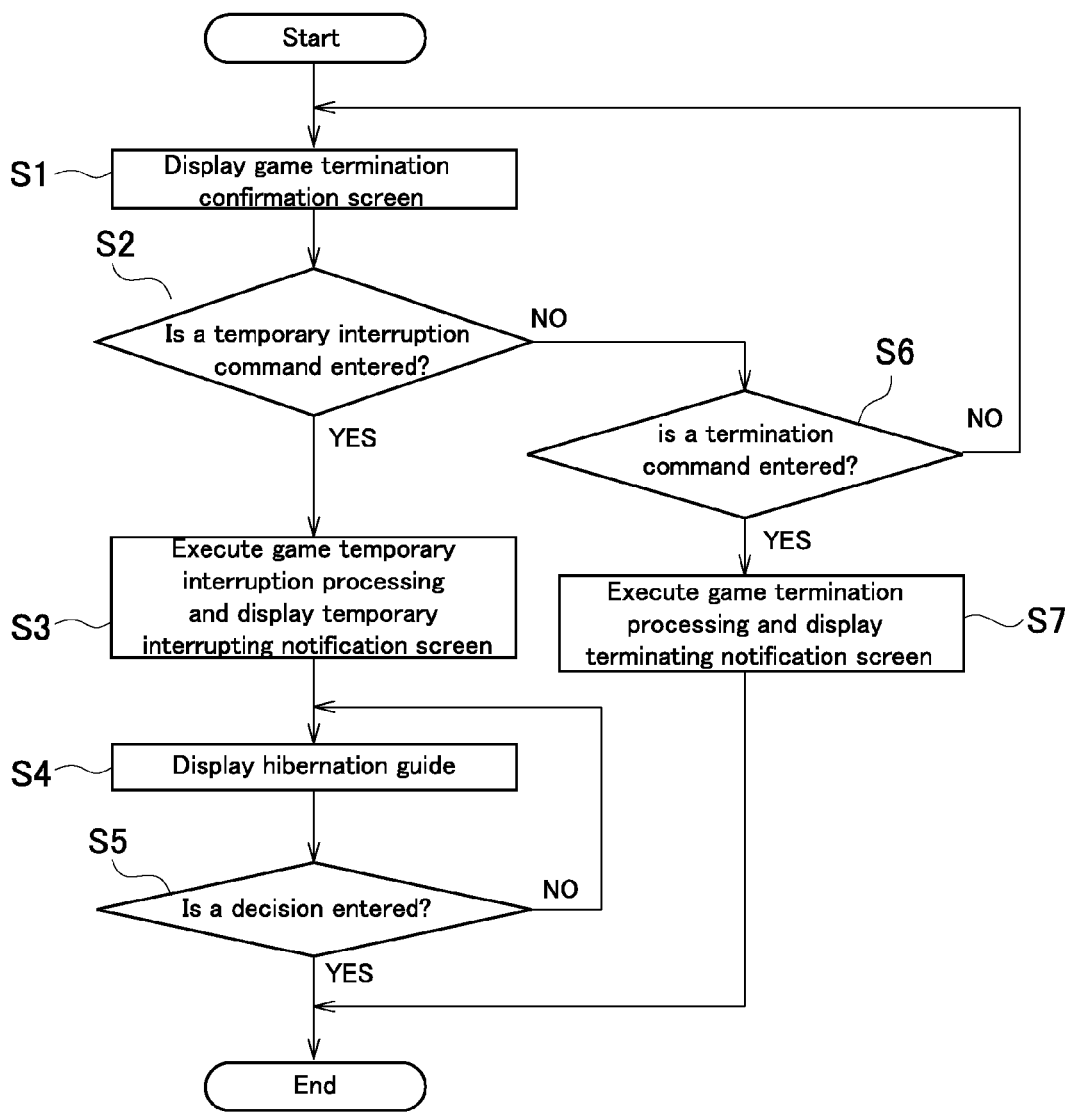
FIG. 7 is a flowchart showing temporary interruption and termination processing of a game.
Figure 9:
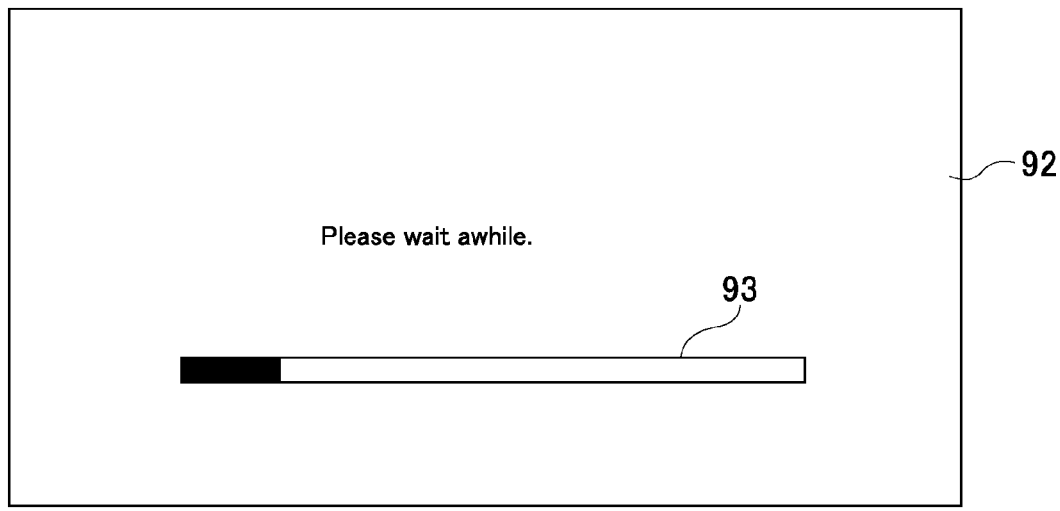
FIG. 9 is a diagram illustrating a temporary interruption notification screen.

If the user of a game in progress enters a game termination selection command (e.g., presses the home button 19) using the controller 20, and the game apparatus 2 receives the game termination selection command from the user, the display control unit 104 displays a game termination confirmation screen 91 (shown in FIG. 8) on the monitor screen 11, as shown in FIG. 7. The game termination confirmation screen 91 is a screen for requesting the user to select either temporary interruption of the game or termination of the game, where texts 'temporarily interrupt game' and 'terminate game' are displayed. Once the user enters an up or down move command (e.g., presses the up or the down command button 21a or 21c) using the controller 20, brings the cursor 15 to the text 'temporarily interrupt game', and enters a decision command (presses the circle button 22b), resulting in the game apparatus 2 receiving a temporary interruption command from the user (step S2: YES), the game execution unit 101 then executes temporary interruption processing for the game, and the display control unit 104 displays a temporarily interrupting notification screen (step S3). During the temporary interruption processing, the hibernation data is stored in the HDD 47 and the game processing is properly terminated. The temporarily interrupting notification screen 92 includes a text 'Please wait awhile.' and a bar graph progress display 93 showing the status of the temporary interruption processing, as shown in FIG. 9.

Note that when the user has entered a return command (pressed the X-mark button 22c or the home button 19) using the controller 20 in the state where the game termination confirmation screen 91 is displayed, the display control unit 104 ends display of the game termination confirmation screen 91, and the game execution unit 101 continues execution of the game processing.

If the game execution unit 101 completes the temporary interruption processing, the display control unit 104 displays a hibernation guide 94 (shown in FIG. 10) on the monitor screen 11 (step S4). The hibernation guide 94 is a display notifying the user that the game processing may be resumed from an interrupted point corresponding to the hibernation data by the user selecting the hibernation data icon 84 displayed on the menu screen 50 and entering an execution decision command, and a possibility that resumed operation may not execute normally in the case where settings of the game program and the game apparatus 2 have been changed. The hibernation guide 94 according to this embodiment includes a text 'The temporarily interrupted game may be resumed by selecting "[game]>[resume game]"', a text 'The game may not resume properly if settings of this apparatus are changed.', a text 'Do not display next time' and its corresponding check box, and the word 'OK'.

If the user enters a decision command (presses the circle button 22b) (step S5: YES) in the state where the hibernation guide 94 is displayed, this processing is terminated, and the display control unit 104 then displays the menu screen 50. Note that when the checkbox of the hibernation guide 94 has been checked so as to enter a decision command, the processing of step S4 and step S5 is omitted subsequently.

Once the user enters an up or down move command using the controller 20, brings the cursor 15 to the text 'terminate game', and enters a decision command (presses the circle button 22b), resulting in the game apparatus 2 receiving a normal termination command from the user (step S6: YES), the game execution unit 101 then executes temporary interruption processing for the game, and the display control unit 104 displays a termination notification screen (omitted from the drawing) (step S7). During the termination processing, the game processing is properly terminated without storing the hibernation data. For example, a text 'Please wait awhile.' is displayed on a terminating notification screen. The game execution unit 101 terminates this processing by completing the termination processing for the game, and the display control unit 104 then displays the menu screen 50.

Moreover, the user may resume the game from the interruption point corresponding to the hibernation data by selecting the hibernation data icon 84 (shown in FIG. 6) on the menu screen 50 and entering an execution decision command.

Since a temporary interrupting function for a game in conformity with the system program is provided in this manner, the user may temporarily interrupt and resume a game by a fixed operation at arbitrary times. For example, a user who wants to reproduce other content during execution of a game may reproduce the other content by interrupting the game through a simple operation as well as resume the game at an arbitrary time without needing a cumbersome operation such as storing save data and terminate the game in conformity with individually set input operations for each game program.

Moreover, since appropriate selection of either temporarily interrupting or terminating the game on the game termination confirmation screen 91 is possible, operability at the time of game termination is good.

Furthermore, since the hibernation guide 94 is displayed when storing the hibernation data, the user understands that resumption of the game from the interruption point is possible once the game is interrupted and that caution is required when updating and the like.

[Start-Up Display]

Figure 11:
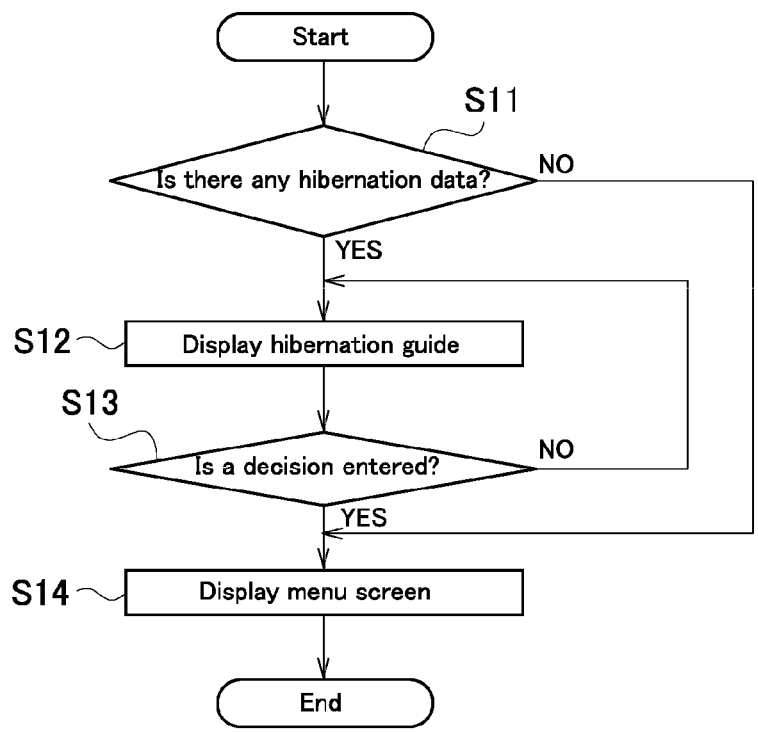
FIG. 11 is a flowchart showing start-up processing.

When the game apparatus 2 is started up, the display control unit 104 determines whether or not the hibernation data is stored in the HDD 47 (step S11), and in the case where the hibernation data is stored (step S11: YES), displays the hibernation guide 94 (shown in FIG. 10) (step S12), as shown in FIG. 11. If the user enters a decision command (presses the circle button 22b) (step S13: YES) in the state where the hibernation guide 94 is displayed, the display control unit 104 then displays the menu screen 50 (step S14), thereby terminating this processing. In this embodiment, the menu screen 50 (shown in FIG. 6) in the state where the hibernation data icon 84 has been selected is displayed.

On the other hand, in the case where the hibernation data is not stored (step S11: No), the display control unit 104 displays the menu screen 50 (step S14), thereby terminating this processing. In this embodiment, the menu screen 50 displayed last during the previous startup is displayed.

Furthermore, since the hibernation guide is displayed when starting up the game apparatus 2, the user understands that resumption of the game from the interruption point is possible once the game is interrupted and that caution is required when updating and the like.

[Update Processing]

Figure 12:
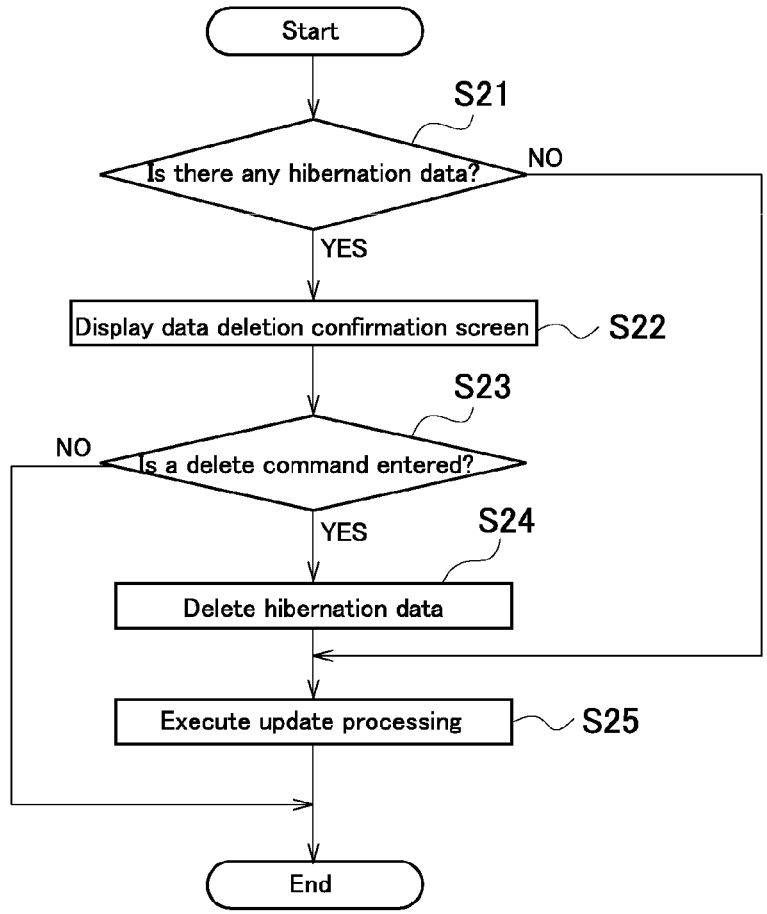
FIG. 12 is a flowchart showing update processing.

If an update execution command for a system program or a game program is entered using the controller 20, the display control unit 104 determines whether or not the hibernation data is stored in the HDD 47 (step S21), and in the case where the hibernation data is stored (step S21: YES), displays a data deletion confirmation screen 95 (shown in FIG. 13) (step S22), as shown in FIG. 12. The data deletion confirmation screen 95 is a display for the user to confirm that the hibernation data will be forcibly deleted through updating. The data deletion confirmation screen 95 according to this embodiment includes a text 'If update is executed, data of [resume game] will be deleted. Do you really want to delete it?' and words 'Yes' and 'No'.

Once the user enters a left or right move command (e.g., presses the left or the right command button 21b or 21d) using the controller 20, brings the cursor 15 to the word 'Yes', and enters a decision command (presses the circle button 22b), the game apparatus 2 then receives an update confirmation command from the user (step S23: YES), the hibernation data stored in the HDD 47 is deleted (step S24), the setting change unit 102 executes update processing (step S25), and this processing is terminated.

Once the user enters a left or right move command using the controller 20, brings the cursor 15 to the word 'No' in the state where the data deletion confirmation screen 95 is displayed, and enters a decision command (presses the circle button 22*b*), the game apparatus 2 then receives an update abort command from the user (step S23: No), this processing is terminated without the setting change unit 103 executing the update processing. Note that when the user has entered a return command (pressed the X-mark button 22*c*) using the controller 20 in the state where the data deletion confirmation screen 95 is displayed, the display control unit 104 hides the data deletion confirmation screen 95 and returns to the immediately preceding display screen.

On the other hand, in the case where the hibernation data is not stored (step S21: No), the setting change unit 103 executes the update processing (step S25), thereby terminating this processing.

Since the hibernation data stored in the HDD 47 is deleted when updating in this manner, an inconvenience of the CPU 30 not responding when resuming a game using the hibernation data, which is due to the program update after the hibernation data was stored, may be prevented surely before it occurs. Moreover, since the hibernation data is deleted before the update processing even in the case where a game program has been altered without the update processing being properly executed, an inconvenience at the time of resuming a game using the hibernation data may be prevented surely before it occurs.

Furthermore, since the data deletion confirmation screen 95 is displayed, after an update execution command is given, the user may abort the update on the ground of existing hibernation data.

[Low Battery Processing]

In a state where the game execution unit 101 is executing game processing with a power supply from the internal battery 105, the battery residual quantity determination unit 106 determines whether or not the residual quantity of the internal battery 105 has dropped to a predetermined quantity or less (whether or not the possibility of the game apparatus 2 stopping operation has increased). If it is determined that the residual quantity of the internal battery 105 has dropped to a predetermined quantity or less, the game execution unit 101 and the storage control unit 102 execute forcible interruption processing. During this compulsory interruption processing, the storage control unit 102 stores the hibernation data in the HDD 47 and the game execution unit 101 properly terminates the game processing in progress.

As a result, the user of the game in progress may resume the game from compulsory interrupted state, even when the game apparatus 2 has stopped operating due to a drop in the battery residual quantity.

<Modification 1>

Figure 14:
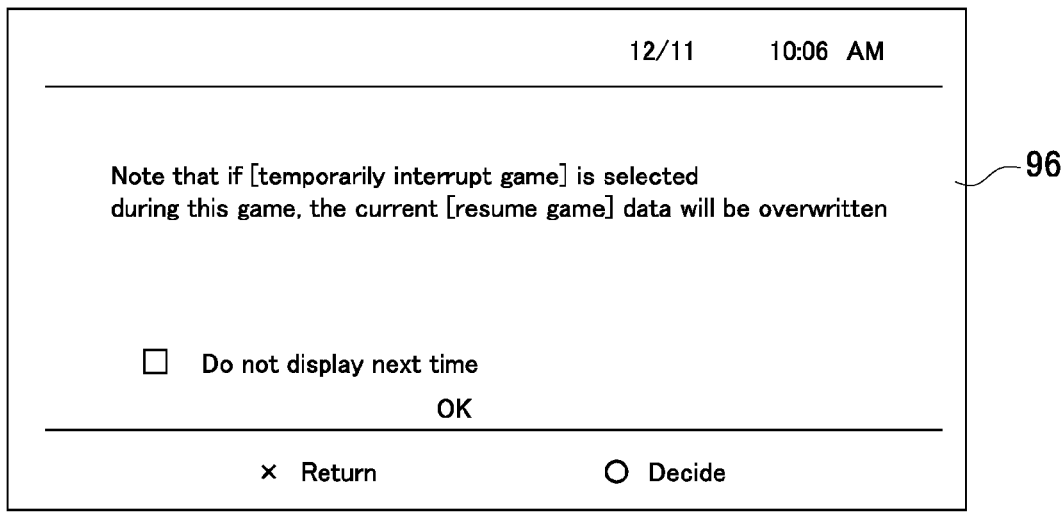
FIG. 14 is a diagram illustrating an overwrite confirmation screen.

When only one piece of hibernation data is storable, or when only one piece of hibernation data is storable for a single game program in a single game apparatus 2, the display control unit 104 may also display an overwrite confirmation screen 96 (shown in FIG. 14) when starting up the game apparatus 2, for example. The overwrite confirmation screen 96 is a screen for notifying that, if a game is temporarily interrupted in accordance with the system program, hibernation data at the time of that interruption will be overwritten on the hibernation data already stored in the HDD 47. The overwrite confirmation screen 96 according to this embodiment includes a text 'Note that if [temporarily interrupt game] is selected during this game, the current [resume game] data will be overwritten.', a text 'Do not display next time', a corresponding check box, and the word 'OK'. If the user enters a decision command with the overwrite confirmation screen 96 displayed, it proceeds to the next processing. Note that when the checkbox of the overwrite confirmation screen 96 has been checked so as to enter a decision command, the processing of step S5 and step S6 is omitted subsequently.

Through display of such an overwrite confirmation screen 96, the user may acknowledge in advance that the hibernation data will be overwritten at the time of temporary interruption.

<Modification 2>

The storage control unit 102 may store in an identifiable state (for example, in the case of basing on the user's intent, including information indicating to this effect in the hibernation data) the hibernation data based on the user's intent as in the case where the user has commanded temporary interruption of a game, and the hibernation data forcibly stored irrespective of the user's intent as in the case of a low battery. This case is limited to the stored hibernation data based on the user's intent, where the data deletion confirmation screen 95 is displayed when updating, or the overwrite confirmation screen 96 is displayed when starting up, but need not be displayed when the data is stored forcibly.

<Modification 3>

In the case of proceeding to sleep mode (energy-saving mode for stopping power supply to the main components such as the CPU 30) when the game apparatus 2 has not received an operation input for more than a predetermined period, when proceeding to sleep mode, the CPU 30 may store the hibernation data in the HDD 47 and properly terminate the game processing, and when returning to normal mode from sleep mode, the game may be resumed from the interruption point using the hibernation data.

<Modification 4>

The save data may be treated the same as the hibernation data. Namely, the processing executed when storing the hibernation data or when hibernation data is stored may also be executed for the save data.

Note that the descriptions of the respective embodiments given above are merely examples of the present invention. Therefore, the present invention is not limited to the respective embodiments given above, and it is needless to say that various changes may be made without departing from the spirit or scope of the present invention.

The present invention is favorably applicable for game apparatus.

The invention claimed is:

1. A game apparatus, comprising:
a game execution unit configured to execute game processing in conformity with predetermined setting information, the predetermined setting information including a game application program and apparatus memory state data, the apparatus memory state data being established by the game application program during execution of the game application program and representing a status of a game in progress being played by a user of the game application program, receive a game termination selection command from the user while executing the game processing, solicit a temporary interruption command in response to receiving the game termination selection command, receive the temporary interruption command from the user after soliciting the temporary interruption command, and terminate the game processing in response to the temporary interruption command from the user;

a storage control unit configured to restore the status of the game in progress at the time of game processing termination by the game execution unit and store in a storage unit interruption information allowing resumption of the game processing in conformity with the apparatus memory state data representing the status of the game in progress to be restored; and a setting changing unit configured to execute an update program to version upgrade the game application program in response to a change command from the user, wherein the storage control unit deletes the interruption information stored in the storage unit in connection with the execution of the update program by the setting changing unit.

2. The game apparatus of claim 1, further comprising:

a display control unit configured to display on a display unit a screen for requesting the user to select either a command for deletion authorization stored in the storage unit or a command for deletion refusal of the interruption information stored in the same, wherein the setting changing unit changes the predetermined setting information in the case where the user has selected the command for deletion authorization, and does not change the predetermined setting information in the case where the user has selected the command for deletion refusal.

3. The game apparatus of claim 1, wherein the setting changing unit changes the predetermined setting information by version upgrading the game application program.

4. The game apparatus of claim 2, wherein the display control unit displays on the display unit at a predetermined time a screen for notifying that the game execution unit may not be able to resume game processing based on the interruption information if the predetermined setting information is changed.

5. The game apparatus of claim 1, further comprising:

an internal battery; and a determination unit for determining whether or not the internal battery residual quantity is a predetermined quantity or less, wherein when the determination unit determines that the internal battery residual quantity is the predetermined quantity or less, the storage control unit stores the interruption information in the storage unit, and the game execution unit terminates the game processing in progress.

6. A game apparatus, comprising a display control unit configured to display on a display unit a screen for requesting a user to select either a temporary interruption command for terminating a game processing that may be resumed from a status of a game in progress at the time of game processing termination, or a normal termination command for terminating a game processing that cannot be resumed from a status of a game in progress at the time of game processing termination;

a game execution unit configured to execute game processing in conformity with predetermined setting information, the predetermined setting information including a game application program and apparatus memory state data, the apparatus memory state data being established by the game application program during execution of the game application program and representing a status of a game in progress being played by a user of the game application program, receive a game termination selection command from the user while executing the game processing, solicit the temporary interruption command in response to receiving the game termination selection command, receive the temporary interruption command from the user after soliciting the temporary interruption command, and terminate the game processing in response to either the temporary interruption command from the user or the normal termination command from the user;

a storage control unit configured to restore the status of the game in progress at the time of game processing termination by the game execution unit and store in a storage unit hibernation data as interruption information allowing resumption of the game processing in conformity with the apparatus memory state data representing the status of the game in progress to be restored; and a setting changing unit configured to execute an update program to version upgrade the game application program in response to a change command from the user, wherein the storage control unit deletes the interruption information stored in the storage unit in connection with the execution of the update program by the setting changing unit.

7. The game apparatus of claim 6, wherein the display control unit displays on the display unit at a predetermined time a screen for notifying that the game execution unit may not be able to resume game processing based on the interruption information if the predetermined setting information is changed.

8. The game apparatus of claim 7, further comprising:

an internal battery; and a determination unit for determining whether or not the internal battery residual quantity is a predetermined quantity or less, wherein when the determination unit determines that the internal battery residual quantity is the predetermined quantity or less, the storage control unit stores the interruption information in the storage unit, and the game execution unit terminates the game processing in progress.

9. An apparatus comprising a microprocessor operating under the control of a computer program to implement a method comprising:

executing game processing in conformity with predetermined setting information, the predetermined setting information including a game application program and apparatus memory state data, the apparatus memory state data being established by the game application program during execution of the game application program and representing a status of a game in progress being played by a user of the game application program, receiving a game termination selection command from the user while executing the game processing, soliciting a temporary interruption command in response to receiving the game termination selection command, receiving the temporary interruption command from the user after soliciting the temporary interruption command, and terminating the game processing in response to the temporary interruption command from the user;

restoring the status of the game in progress at the time of game processing termination so as to generate interruption information allowing resumption of the game processing and storing the generated interruption information in a storage unit in conformity with the apparatus memory state data representing the status of the game in progress to be restored;

executing an update program to version upgrade the game application program in response to a change command from the user; and deleting the stored interruption information in connection with the execution of the update program.

10. An apparatus comprising a microprocessor operating under the control of a computer program to implement a method comprising:
    displaying a screen for requesting a user to select either temporary interruption for terminating a game processing that may be resumed from a status of a game in progress at the time of game processing termination, or normal termination for terminating a game processing that cannot be resumed from a status of a game in progress at the time of game processing termination;
    executing game processing in conformity with predetermined setting information, the predetermined setting information including a game application program and apparatus memory state data, the apparatus memory state data being established by the game application program during execution of the game application program and representing a status of a game in progress being played by a user of the game application program, receiving a game termination selection command from the user while executing the game processing, soliciting a temporary interruption command in response to receiving the game termination selection command, receiving the temporary interruption command from the user after soliciting the temporary interruption command, and terminating the game processing in response to a command for selecting either the temporary interruption or the normal termination from the user; and
    restoring the status of the game in progress at the time of game processing termination so as to generate hibernation data as interruption information allowing resumption of the game processing and storing the generated interruption information in conformity with the apparatus memory state data representing the status of the game in progress to be restored,
    executing an update program to version upgrade the game application program in response to a change command from the user, and
    deleting the stored interruption information in connection with the execution of the update program.

11. A non-transitory, computer readable storage medium containing a game interruption program making a computer of a game apparatus function as:
    a game execution unit configured to execute game processing in conformity with predetermined setting information, the predetermined setting information including a game application program and apparatus memory state data, the apparatus memory state data being established by the game application program during execution of the game application program and representing a status of a game in progress being played by a user of the game application program, receive a game termination selection command from the user while executing the game processing, solicit a temporary interruption command in response to receiving the game termination selection command, receive the temporary interruption command from the user after soliciting the temporary interruption command, and terminate the game processing in response to the temporary interruption command from the user;
    a storage control unit configured to restore the status of the game in progress at the time of game processing termination by the game execution unit so as to generate interruption information allowing resumption of the game processing and store the generated interruption information in a storage unit in conformity with the apparatus memory state data representing the status of the game in progress to be restored; and
    a setting changing unit configured to execute an update program to version upgrade the game application program in response to a change command from the user,
    wherein the storage control unit deletes the interruption information stored in the storage unit in connection with the execution of the update program by the setting changing unit.

12. A non-transitory, computer readable storage medium containing a game interruption program making a computer of a game apparatus function as:
    a display control unit configured to display on a display unit a screen for requesting a user to select either temporary interruption for terminating a game processing that may be resumed from a status of a game in progress at the time of game processing termination, or normal termination for terminating a game processing that cannot be resumed from a status of a game in progress at the time of game processing termination;
    a game execution unit configured to execute game processing in conformity with predetermined setting information, the predetermined setting information including a game application program and apparatus memory state data, the apparatus memory state data being established by the game application program during execution of the game application program and representing a status of a game in progress being played by a user of the game application program, receive a game termination selection command from the user while executing the game processing, solicit a temporary interruption command in response to receiving the game termination selection command, receive the temporary interruption command from the user after soliciting the temporary interruption command, and terminate the game processing in response to a command for selecting either the temporary interruption or the normal termination from the user;
    a storage control unit configured to restore the status of the game in progress at the time of game processing termination by the game execution unit so as to generate hibernation data as interruption information allowing resumption of the game processing and store the generated interruption information in a storage unit in conformity with the apparatus memory state data representing the status of the game in progress to be restored; and
    a setting changing unit configured to execute an update program to version upgrade the game application program in response to a change command from the user,
    wherein the storage control unit deletes the interruption information stored in the storage unit in connection with the execution of the update program by the setting changing unit.

* * * * *